(12) United States Patent
Kijima et al.

(10) Patent No.: US 6,377,521 B1
(45) Date of Patent: Apr. 23, 2002

(54) BIAXIAL ACTUATOR, OPTICAL PART AND OPTICAL DISK DEVICE

(75) Inventors: Yoshito Kijima; Shigekazu Misono, both of Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/372,981

(22) Filed: Aug. 12, 1999

(30) Foreign Application Priority Data

Aug. 14, 1998 (JP) .............................. 10-244403

(51) Int. Cl.⁷ .................................. G11B 7/12
(52) U.S. Cl. .................... 369/44.23; 369/44.14; 369/44.16; 369/112.01; 359/823
(58) Field of Search ................ 369/44.11, 44.14, 369/44.15, 44.16, 44.22, 44.23, 44.28, 47.1, 53.1, 112.01, 75.1; 359/823, 824

(56) References Cited

U.S. PATENT DOCUMENTS 5,627,687 A * 5/1997 Fujisawa ..................... 359/823
5,881,033 A * 3/1999 Murakami et al. ......... 369/44.14
6,141,309 A * 10/2000 Saitou et al. ............... 369/75.1

FOREIGN PATENT DOCUMENTS

| EP | 63042043 | 2/1988 |
|----|----------|--------|
| EP | 63167434 | 7/1988 |
| EP | 0 410 518 | 1/1991 |
| EP | 03230327 | 1/1992 |
| EP | 0 561 420 A1 | 3/1993 |
| EP | 0 704 842 A1 | 4/1996 |
| EP | 09091736 | 4/1997 |
| EP | 10143892 | 5/1998 |
| JP | 59-188850 | 3/1985 |
| JP | 63-42043 | 2/1988 |
| JP | 63-167434 | 7/1988 |
| JP | 3-230327 | 10/1991 |
| JP | 9-91736 | 4/1997 |
| JP | 10-143892 | 5/1998 |

OTHER PUBLICATIONS

European Search Report dated Nov. 09, 1999.

* cited by examiner

*Primary Examiner*—Muhammad Edun
(74) *Attorney, Agent, or Firm*—Rader, Fishman & Grauer

(57) ABSTRACT

In a biaxial actuator including an objective lens for converging a laser beam emitted from a light source to irradiate the laser beam on an information recording surface of an optical disk and guiding a laser beam reflected by the information recording surface to a photo detector, and a holder for causing the objective lens to oppose the information recording surface with a predetermined gap, the objective lens and the holder are formed such that the objective lens and the holder are integrally molded by using a synthetic resin which can transmit a laser beam.

22 Claims, 14 Drawing Sheets

BIAXIAL ACTUATOR, OPTICAL PART AND OPTICAL DISK DEVICE

BACKGROUND OF THE INVENTION

1. Field of the Invention

The present invention relates to an optical pickup device used in an optical storage device for recording (writing) and/or reproducing (reading) an information signal by using an optical recording medium such as an optical disk, a magneto optical disk or the like and a biaxial actuator for the optical pickup device and, more particularly, to the structure of a bobbin having an objective lens opposing an information recording surface of an optical recording medium, a holder therefor, a member obtained by coupling the objective lens and the hold, and a coil member.

2. Description of the Related Art

In an optical disk storage device for recording and/or reproducing an information signal by using an optical disk such as a read-only optical disk, a phase change optical disk or a magneto optical disk on which an information signal can be recorded and reproduced or the like as an optical recording medium, an optical disk is placed on a disk table attached to the rotating shaft of a spindle motor to be rotatably driven, and an optical head of an optical pickup device can approach or leave from the spindle motor.

An optical pickup device has a light source for emitting a laser beam, a photo detector for receiving a laser beam obtained by reflecting the laser beam emitted from the light source by an information recording surface of an optical disk, and the like. An objective lens of the optical head is arranged to oppose the information recording surface of the optical disk. A laser beam converged by the objective lens and irradiated in a direction almost vertical to the information recording surface is reflected by the information recording surface, transmitted through the objective lens again, and received by the photo detector. When the objective lens is moved from the inside to the outside in the radial direction along the information recording surface of the optical disk, so that an information signal can be recorded on the information recording surface, or an information signal recorded on the information recording surface can be reproduced.

As a biaxial actuator of such an optical pickup device, for example, a biaxial actuator as shown in FIG. 1 and FIG. 2 is known. This biaxial actuator 1 includes a movable portion 3 having an objective lens 2 to be opposed to an information recording surface of an optical disk, a fixed portion 5 for elastically supporting the movable portion 3 through a support member 4, and a base member 6 to which the fixed portion 5 is fixed, and the like.

The movable portion 3 has a holder 7 which holds the objective lens 2 such that the objective lens 2 is adhered to the holder by an adhesive agent and a square-cylindrical bobbin 8 coupled to and integrated with the holder 7, and a focus drive coil 9 is wound on the bobbin 8 in a direction perpendicular to the optical axis direction of the objective lens 2. A pair of tracking drive coils 10, 10 are attached to the outside of the focus drive coil 9 on one side of the bobbin 8 such that the tracking drive coils are wound in a direction parallel to the optical axis direction of the objective lens 2.

One ends of two suspension wires 4 serving the support members are vertically attached to each of both of the side portions of the holder 7 of the movable portion 3 with a predetermined gap in an up and down direction. The other ends of the suspension wires 4 extend on the opposite side of the objective lens 2 and fixed to the wire support block 5 serving as a fixed portion. The wire support block 5 is fixed to the actuator base 6 serving as a base member by a fixing means serving as a fixing screw 11. The winding end portions of the focus drive coil 9 and the tracking drive coils 10 are wound on the suspension wires 4 on the movable portion side, and soldered to be conductive lines for supplying a current to the focus drive coil 9 and the tracking drive coils 10.

A pair of yokes 12 are planted in parallel on the actuator base 6 with a predetermined gap in a direction in which the suspension wire 4 extends. Magnets 13 are respectively fixed to the opposite surfaces of both the yokes 12 by a fixing means using an adhesive agent. In the gap where the pair of magnets 13 are opposite to each other, one side of the bobbin 8 to which the tracking drive coils 10 is attached is inserted with a predetermined gap.

In this manner, when a current is supplied to the focus drive coil 9 through the suspension wires 4, a thrust in an optical axis direction (focus direction) is generated by the magnetic flux generated by the magnets 13, so that the objective lens 2 moves in the optical axis direction thereof to perform focusing control. In addition, when a current is supplied to the tracking drive coils 10 through the suspension wires 4, a thrust in a direction (i.e., a tracking direction) perpendicular to the optical axis is generated by the magnetic flux generated by the magnets 13, so that the objective lens 2 moves in the perpendicular direction thereto to perform tracking control.

On the basis of the focusing control of the focus drive coil 9 and the tracking control of the tracking drive coils 10, a focal point of a laser beam converged by the objective lens 2 flows up a periodic move of a recording track on the information recording surface of the optical disk, and the focal point is always formed on the recording track.

However, in the biaxial actuator of the conventional optical pickup device described above, the objective lens 2 and the holder 7 are constituted by independent members, respectively, and the objective lens 2 and the holder 7 are adhered to each other by an adhesive agent to be integrated with each other. For this reason, the following problem is posed.

More specifically, when the adhesive agent is used as the means for fixing the objective lens 2 and the holder 7 to each other, the adhesive agent is distorted by contraction caused by hardening of the adhesive agent in assembly, contraction caused by hardening based on a change in temperature, degradation, or the like after the adhesion, extension caused by softening, or the like, the assembly precision of the objective lens 2 may vary, or an attaching position or an attaching state thereof may change. In addition, when the adhesive agent is used, not only the number of assembly steps increases, but also the adhesive agent is uneconomical because the cost of the adhesive agent itself increases.

SUMMARY OF THE INVENTION

The present invention has been made in view of the above problem, and has as its object to solve the above problem by forming an objective lens and a holder such that the objective lens and the holder are integrally molded by a synthetic resin which can transmit a laser beam.

According to the present invention, in order to solve the above problem or the like and achieve the above object, there is provided a biaxial actuator which comprises an objective lens for converging a laser beam emitted from a light source to be irradiated on an information recording surface of an optical recording medium and guiding a laser beam reflected by the information recording surface to a photo detector, and a holder for causing the objective lens to oppose the information recording surface with a predetermined gap, which is characterized in that the objective lens and the holder are formed to be integrally molded by using a synthetic resin which can transmit the laser beam.

BRIEF DESCRIPTION OF THE DRAWINGS

FIG. 7, having FIGS 7A to 7D, depict diagrams to show a coupling portion between a holder-integrated lens and a bobbin according to the biaxial actuator of the present invention, in which FIG. 7A is a perspective view of a state before caulking, FIG. 7B is a sectional view of FIG. 7A, FIG. 7C is a perspective view of a state after caulking, and FIG. 7D is a sectional view of FIG. 7C;

FIG. 13, having FIGS. 13A to 13D, depict diagrams used to explain the relationship between tracking drive coils and a magnet, in which FIG. 13A is a plan view, FIG. 13B is a plan view showing the directions of magnetic fluxes, FIG. 13C is a plan view showing the directions of magnetic fluxes, and FIG. 13D is a plan view showing the directions of forces;

FIG. 14, having FIGS. 14A to 14C, depict diagrams used to explain the relationship between tracking drive coils and a magnet, in which FIG. 14A is a side view, FIG. 14B is a plan view showing the directions of forces, and FIG. 14C is a plan view showing the directions of magnetic fluxes generated by two yokes;

FIG. 18 having FIGS. 18A to 18B depict diagrams to show the directions of magnetic fluxes obtained when the tracking drive coils are arranged in parallel to the magnet, in which FIG. 18A is a plan view, and FIG. 18B is a side view;

FIG. 19, having, FIGS 19A and 19B depict diagrams to show the directions of magnetic fluxes obtained when the tracking drive coils are arranged to be inclined with respect to the magnet, in which FIG. 19A is a plan view, and FIG. 19B is a side view.

DESCRIPTION OF THE PREFERRED EMBODIMENTS

Embodiments of the present invention will be described below with reference to the accompanying drawings. FIGS. 3 to 20 show an embodiment of the present invention. The present invention is applied to a biaxial actuator of an optical pickup device which is preferably used in an optical disk reproduction device representing a concrete example of an optical disk storage device which only reproduces (reads) an information signal by using a read-only optical disk as an optical recording medium.

Figure 1:
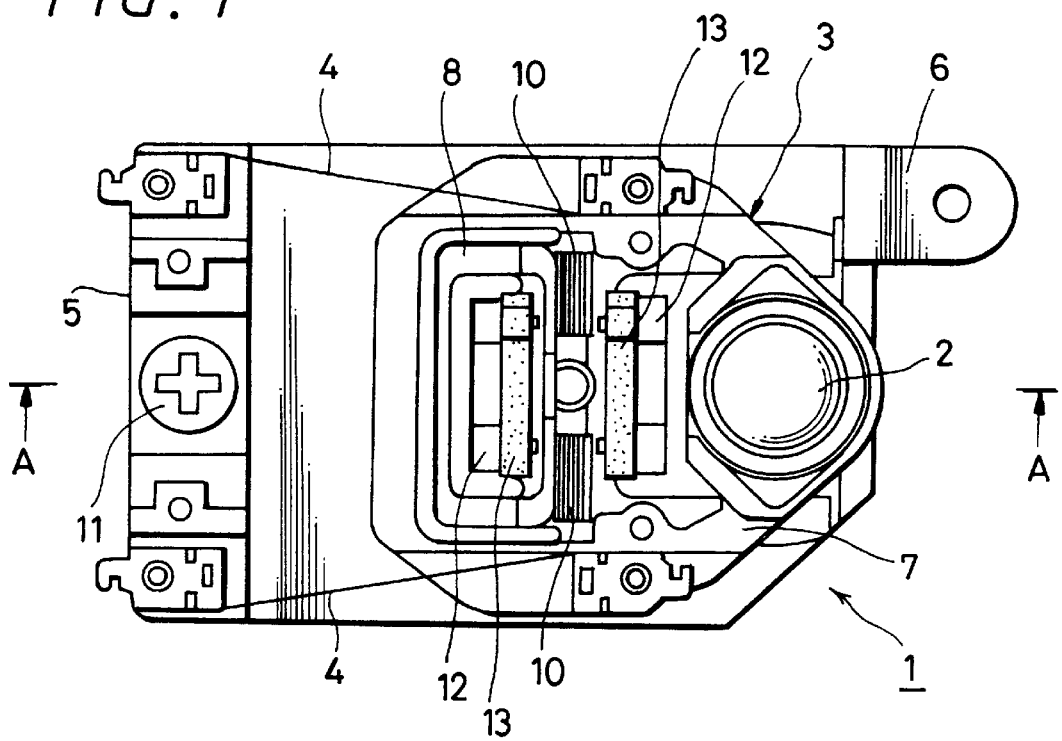
FIG. 1 is a plan view showing a conventional biaxial actuator.
Figure 2:
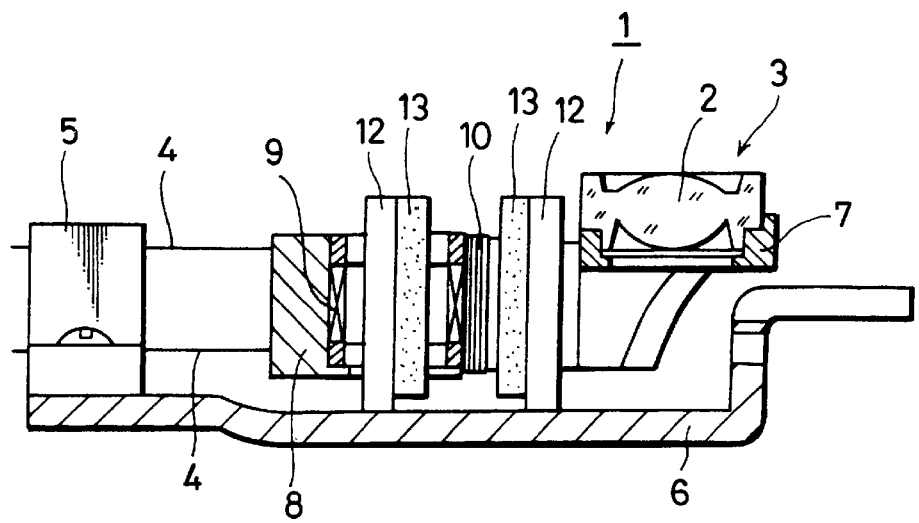
FIG. 2 is a central longitudinal sectional view showing the conventional biaxial actuator.
Figure 3:
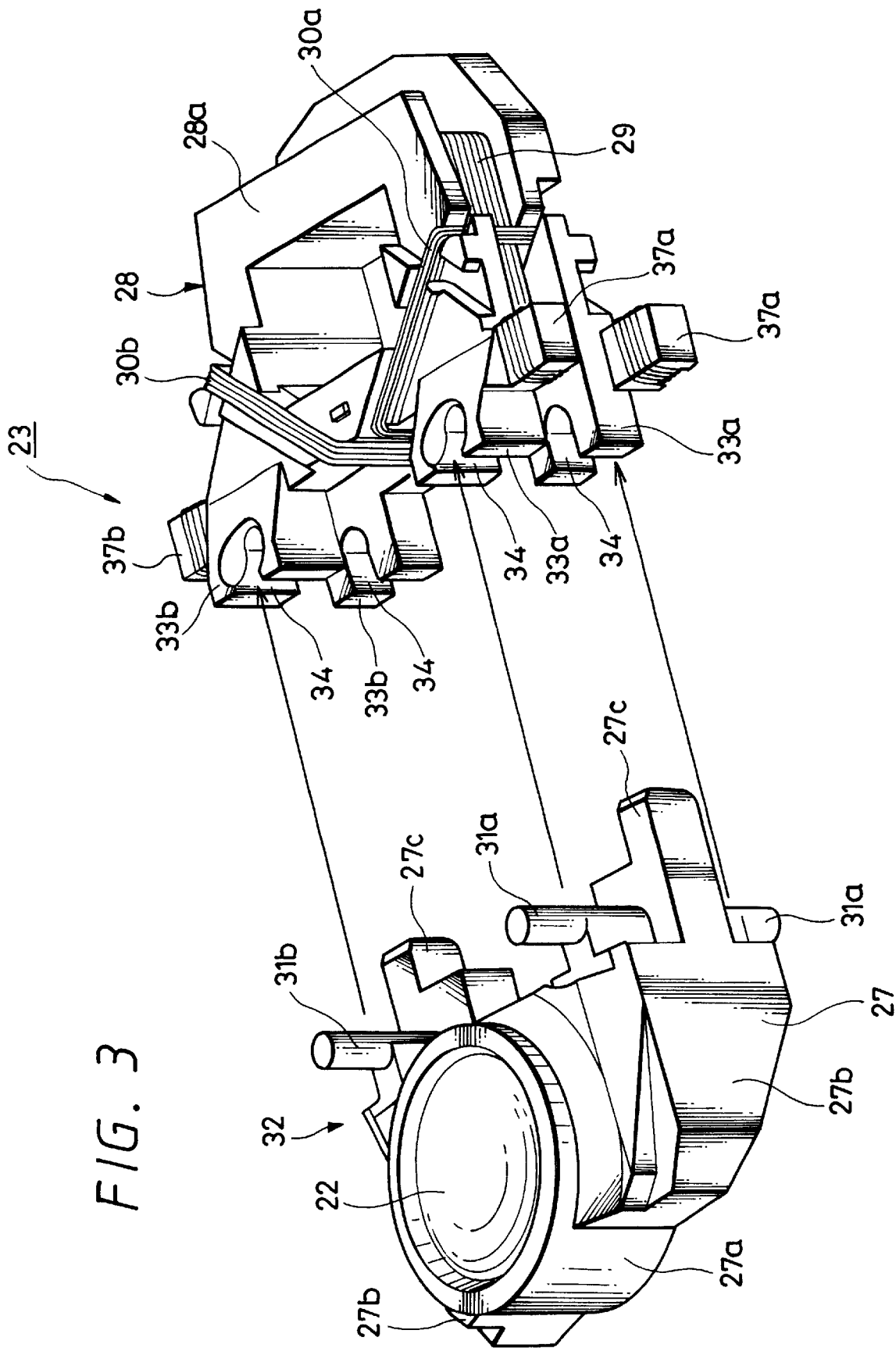
FIG. 3 is a perspective view showing a holder-integrated lens and a bobbin according to a first embodiment of the biaxial actuator of the present invention.
Figure 4:
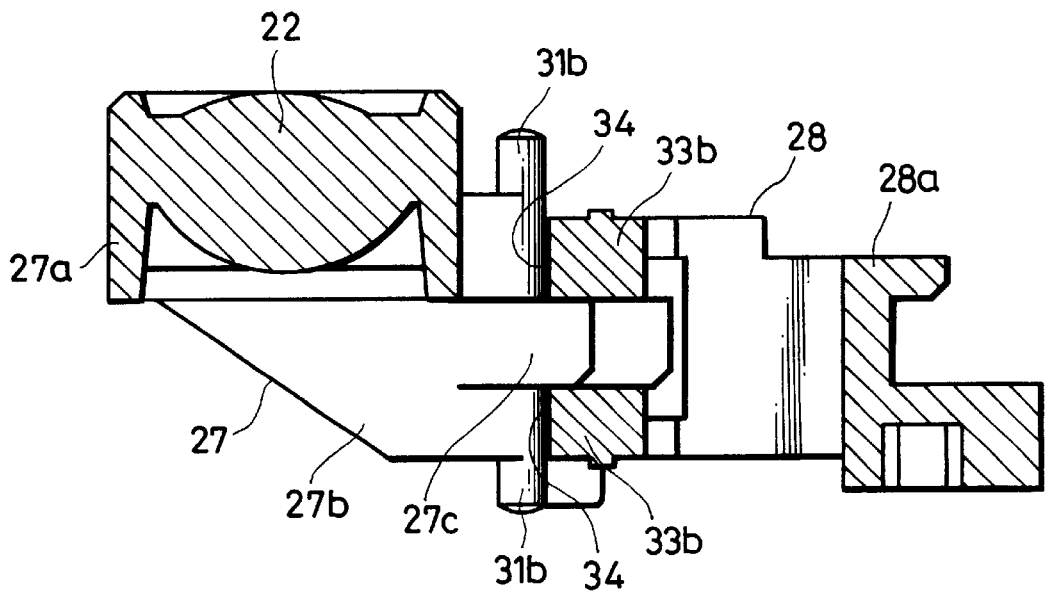
FIG. 4 is a central longitudinal sectional view showing the holder-integrated lens according to the first embodiment of the biaxial actuator of the present invention.
Figure 5:
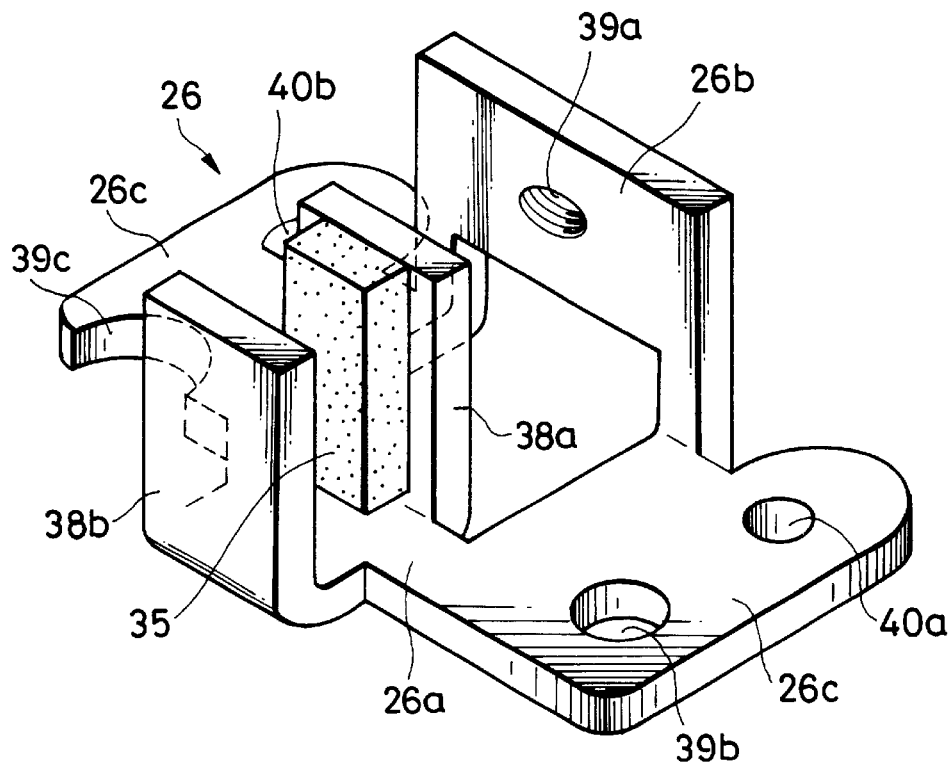
FIG. 5 is a perspective view showing a base member according to the first embodiment of the biaxial actuator according to the present invention.
Figure 6:
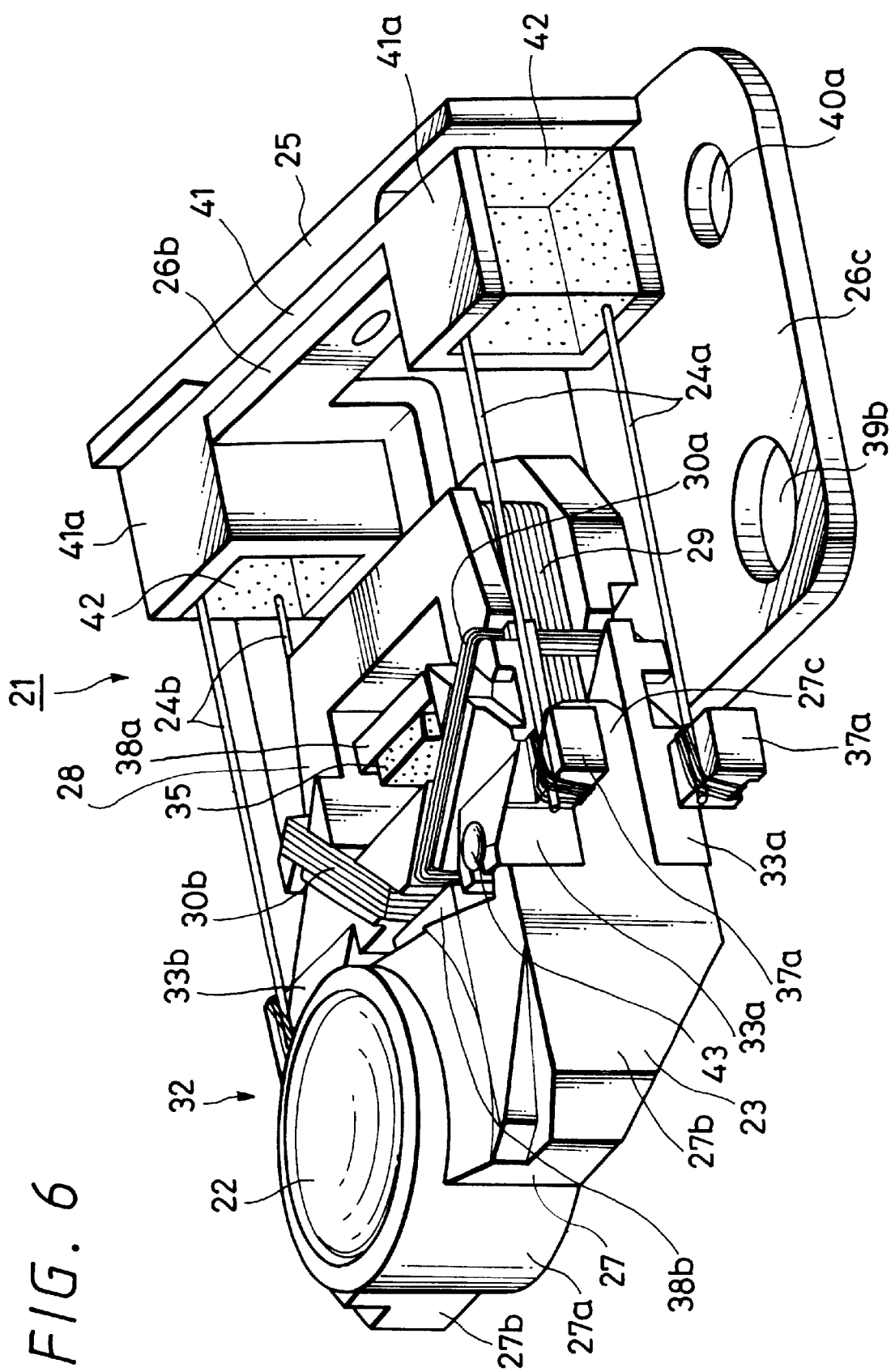
FIG. 6 is a perspective view showing the first embodiment of the biaxial actuator of the present invention.
Figure 8:
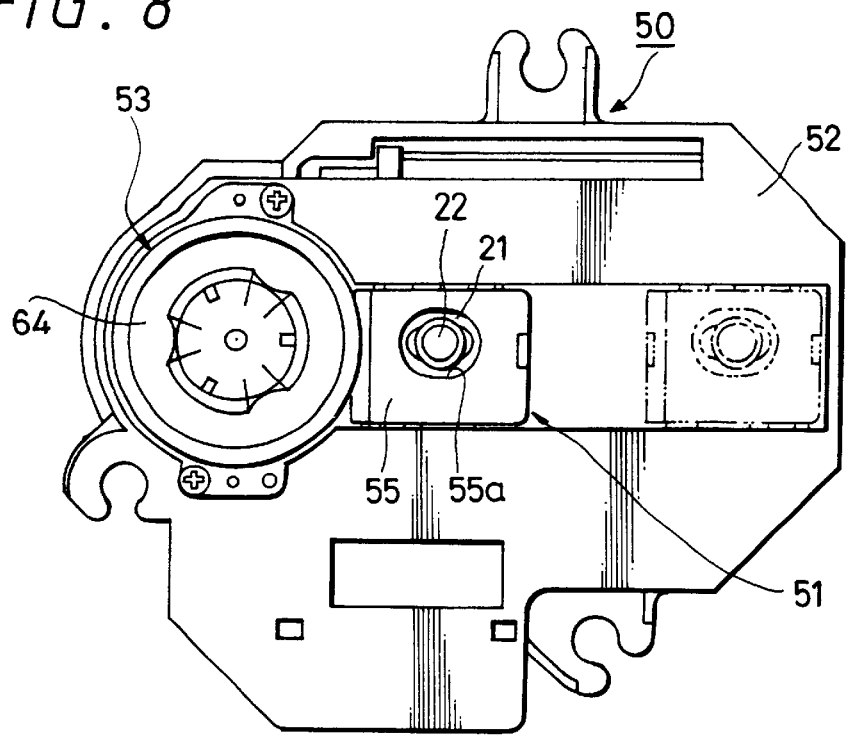
FIG. 8 is a plan view showing a disk drive device provided with an optical pickup device having the biaxial actuator of the present invention.
Figure 9:
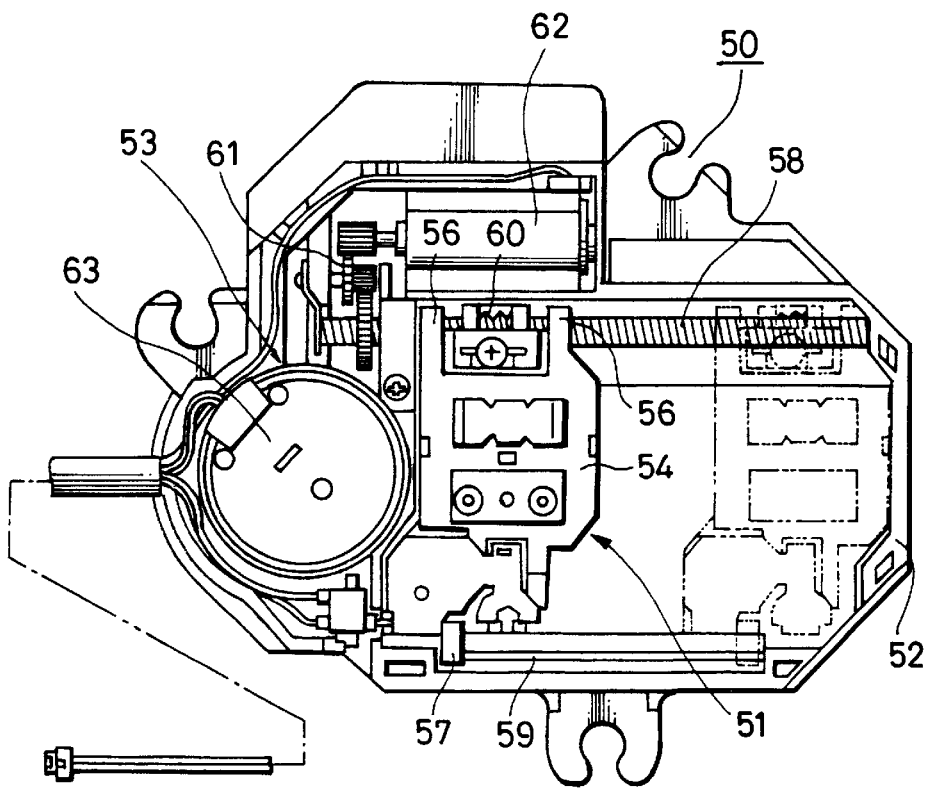
FIG. 9 is a bottom view showing the disk drive device provided with the optical pickup device having the biaxial actuator of the present invention.
Figure 10:
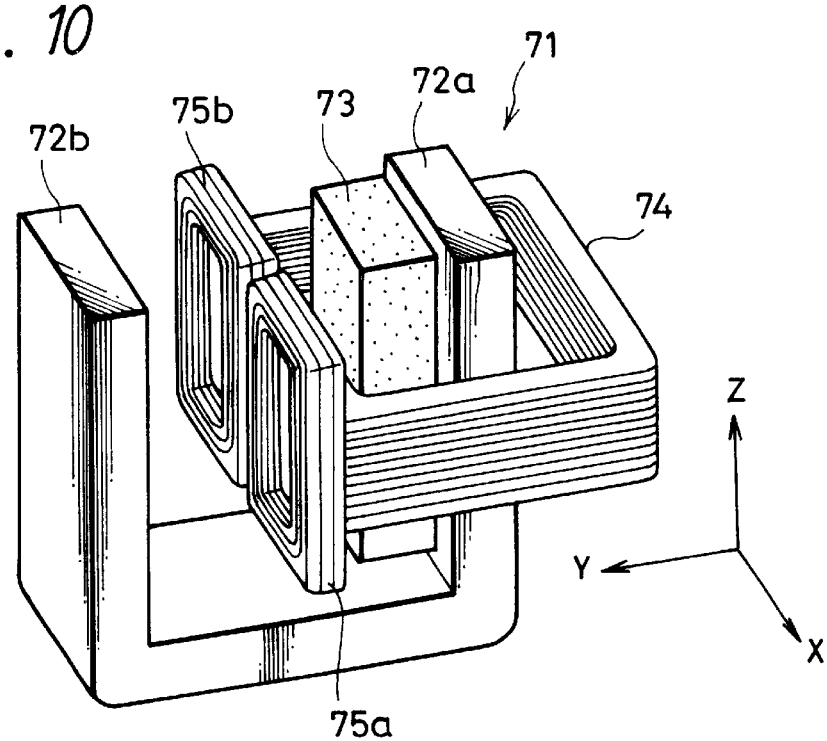
FIG. 10 is a perspective view showing a biaxial actuator in which tracking drive coils are arranged in parallel to a magnet.
Figure 11:
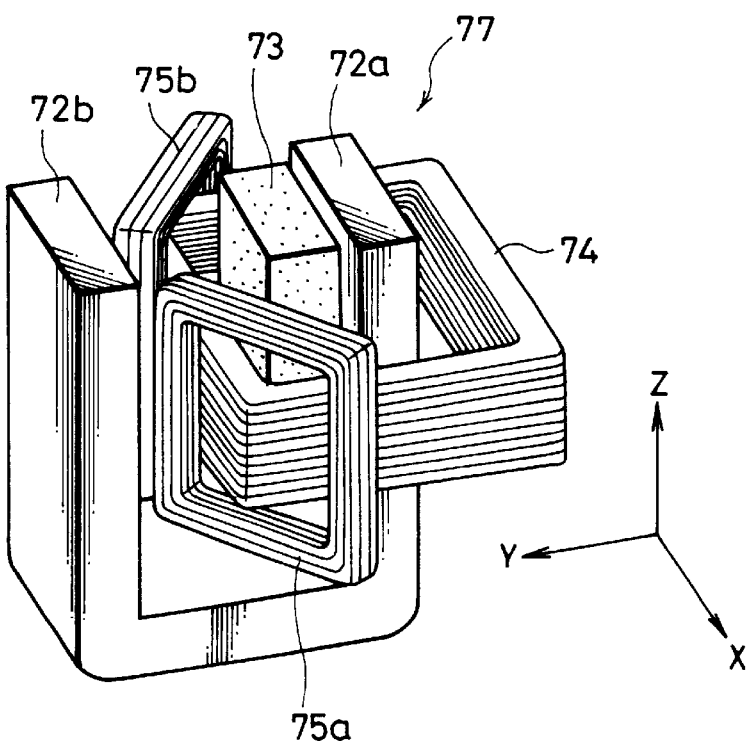
FIG. 11 is a perspective view showing a biaxial actuator in which tracking drive coils are arranged to be inclined with respect to a magnet.
Figure 12:
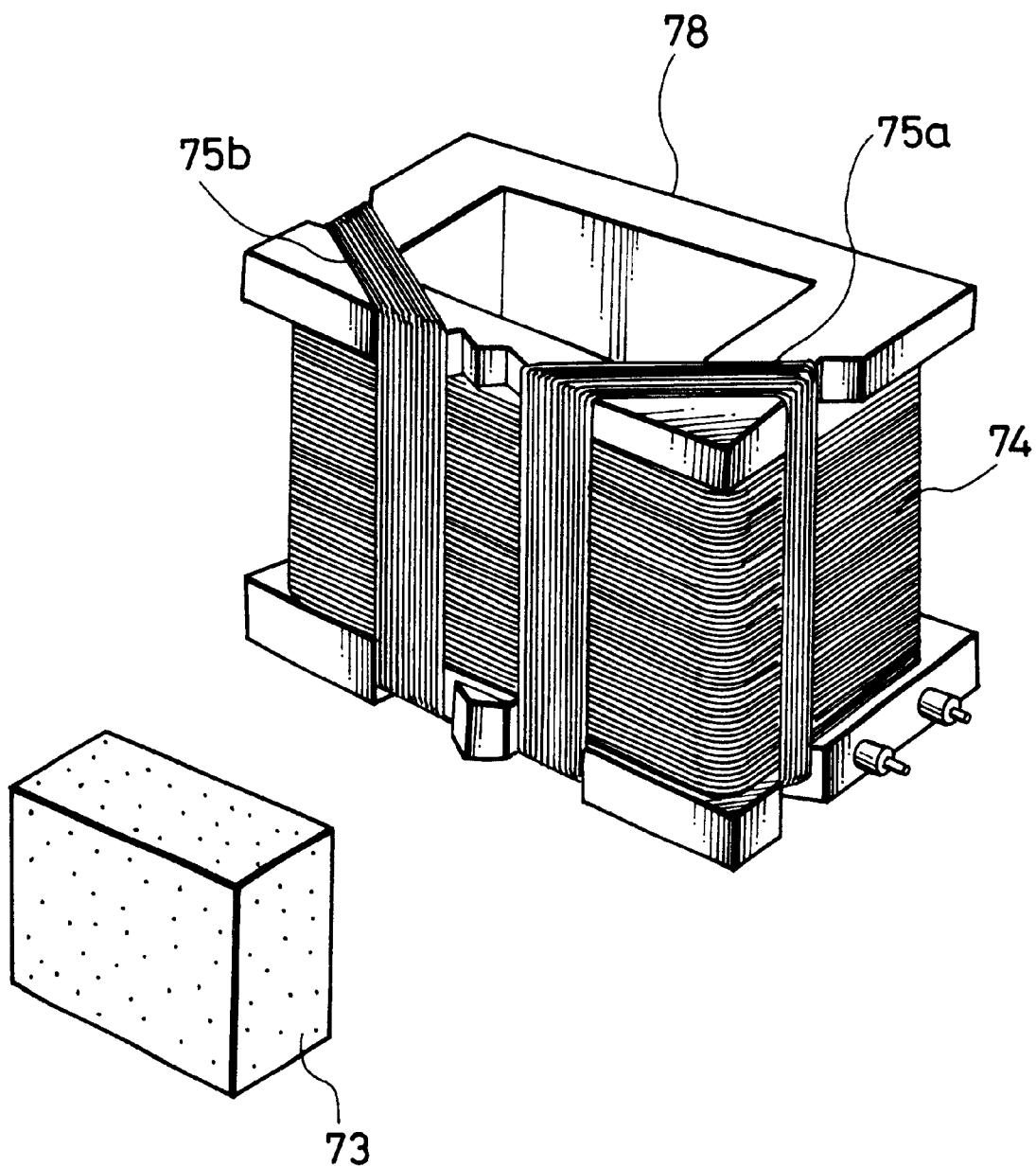
FIG. 12 is a perspective view showing another example of the biaxial actuator in which tracking drive coils are arranged to be inclined with respect to a magnet.

More specifically, FIG. 3 is a perspective view showing a holder-integrated lens and a bobbin of a biaxial actuator according to a first embodiment of the present invention; FIG. 4 is a central longitudinal sectional view of the holder-integrated lens; FIG. 5 is a perspective view of a base member; FIG. 6 is a perspective view of the biaxial actuator; FIGS. 7A to 7D are views for explaining coupled portions between the holder-integrated lens and the bobbin; FIG. 8 is a plan view of an optical pickup device; and FIG. 9 is a bottom view of the optical pickup device. FIG. 10 is a perspective view showing a first example of a positional relationship among a coil member, a magnet, and a yoke; FIG. 11 is a perspective view showing a second example of a positional relationship among a coil member, a magnet, and a yoke; FIG. 12 is a view showing the concrete configuration of FIG. 11; FIGS. 13 to 19 are views for explaining relationships among the positions of a coil member and a magnet, currents, magnetic fluxes, and force; and FIG. 20 is a perspective view showing a holder-integrated lens and a bobbin of a biaxial actuator according to a second embodiment of the present invention.

A biaxial actuator 21 serving as an optical head drive device of an optical pickup device according to this embodiment, as shown in FIG. 6, comprises a movable portion 23 having an objective lens 22 to be opposed an information recording surface of an optical disk, a fixing portion 25 for elastically supporting the movable portion 23 through support members 24a, 24b and a base member 26 to which the fixing portion 25 is fixed. The movable portion 23 of the biaxial actuator 21 is constituted by the objective lens 22, a holder 27 for holding the objective lens 22, a bobbin 28 coupled to the holder 27 to be integrated with the holder, two types of coils, i.e., a focus drive coil 29 and tracking drive coils 30a, 30b, serving as coil members.

The objective lens 22 and the holder 27 of the movable portion 23, as shown in FIG. 3 and FIG. 4, are formed by integral molding using a synthetic resin which can transmit a laser beam as a single optical part. The holder 27 has a cylindrical lens support portion 27a, and the objective lens 22 constituted by an a spherical lens is integrally formed in a concave portion of the lens support portion 27a. One pair of shoulder portions 27b, 27b projecting on both the outside in a direction perpendicular to the optical axis of the objective lens 22 are formed on the outer peripheral surface of the lens support portion 27a. Engagement pieces 27c, 27C projecting in parallel to each other with a predetermined gap are formed in the rear of the pair of shoulder portions 27b, 27b.

In addition, engagement pins 31a and 31b representing concrete examples of engagement projection portions are protuberantly and integrally formed on the upper and lower surfaces of each of the engagement pieces 27c of the holder 27. The upper and lower engagement pins 31a, 31a and 31b, 31b are set on the same axial lines, respectively, and these axial lines are set to be parallel to the optical axis of the objective lens 22. A holder-integrated lens 32 is formed by the holder 27 and the objective lens 22.

As the material of the holder-integrated lens 32, for example, a lens material "Zeonex: trademark" available from Japan Synthetic Rubber Co., Ltd. can be applied. This mutual is a polyolefin-based resin whose main chain has a norbornene structure and has the following merits. That is, "Zeonex" has excellent light transmittance, is excellent in electric insulating property, has a small dielectric constant and a small dielectric tangent over a wide range of a low frequency to a high frequency, and is not easily changed by a frequency and a temperature. As another material, a lens material "Arton: trademark" available from the same Japan Synthetic Rubber Co., Ltd. can be applied. These materials are equal to each other in that the main chains have norbornene structures. However, the materials are different from each other in that "Arton" has a polar group in its side chain, but the "Zonex" does not have a polar group.

The bobbin 28 of the movable portion 23 has a bobbin body 28a having an almost-square-cylindrical shape and left and right engagement pieces 33a and 33b representing concrete examples of engagement receiving portions and projecting on one surface side of the bobbin body 28a. The left and right engagement pieces 33a and 33b are constituted by pairs of upper and lower engagement pieces, respectively, and hence four engagement pieces 33a and 33b are provided totally. A slit-like engagement groove 34 is formed in each of the engagement pieces 33a and 33b to be opened on a side of the corresponding engagement piece. The engagement pins 31a and 31b described above are respectively engaged with the engagement grooves 34.

The focus drive coil 29 and the pair of tracking drive coils 30a and 30b representing concrete examples of coil members are arranged on the bobbin body 28a of the bobbin 28 such that these coils are wound on the bobbin body at proper turns, respectively. More specifically, the focus drive coil 29 is wound on the outer peripheral surface of the bobbin body 28a in a direction perpendicular to the optical axis direction of the objective lens 22 with a virtual axis parallel to the optical axis as a center. On one side of the bobbin body 28a on which the engagement pieces 33a and 33b are formed, a part of the focus drive coil 29 passes between the upper and lower engagement pieces 33a (or 33b).

The pair of tracking drive coils 30a and 30b are respectively wound at corner portions of the bobbin body 28a on which the left and right engagement pieces 33a and 33b are formed o,n the outside of the focus drive coil 29 with virtual axes respectively perpendicular to the optical axis as centers, respectively. More specifically, inside one upper and lower engagement pieces 33a, 33a, one tracking drive coil 30a is wound between one side on the engagement piece side and one side almost perpendicular thereto. Inside the other upper and lower engagement pieces 33b, 33b, the other tracking drive coil 30b is wound between one side on the engagement piece side and the other side almost perpendicular thereto.

The coil winding states of the focus drive coil 29 and the pair of tracking drive coils 30a and 30b wound on the bobbin body 28a are shown in FIG. 3. A magnet 35 is, as shown in FIG. 6, arranged on a surface side opposing internal acting portions 36a, 36aextending in the direction of the optical axis of the pair of tracking drive coils 30a and 30b. The acting portions 36a, 36aof the pair of tracking drive coils 30a and 30b are arranged with a predetermined gap in parallel to each other.

The start portions and the end portions of the focus drive coil 29 and the pair of tracking drive coils 30a and 30b are wound on hold portions 37a and 37b formed on the bobbin 28. The hold portions 37a and 37b are formed at a total of four positions, i.e., two left positions and two right positions, as projections extending in a direction perpendicular to the left and right engagement pieces 33a and 33b of the bobbin body 28a near the engagement pieces. After the coils 29, 30a, and 30b are wound on the hold portions 37a and 37b, the start portions and the end portions of the respective coils are wound on four suspension wires 24a and 24b serving as support members, independently, so that the coils are fixed by a fixing means such as soldering to be rendered conductive.

Two of the four suspension wires 24a and 24b are each arranged on both the sides of the holder-integrated lens 32 with a predetermined gap in the up and down direction. The suspension wires 24a and 24b are made of a material excellent in conductivity and having proper flexibility. As the material of the suspension wires 24a and 24b, for example, phosphor bronze is preferably used. However, another metal can be used as a matter of course. In addition to the metal, for example, plastic rods or the like which are rendered conductive by mixing metal powder in plastic can also be used.

In addition, the other ends of the suspension wires 24a and 24b backwardly extend on the side opposing the objective lens 22, are inserted into through holes of a printed circuit board 25 serving as the fixing member, and are connected to the wiring pattern of the printed circuit board by soldering to be fixed thereto. The printed circuit board 25 is fixed to an actuator base 26 serving as the base member by a fixing member such as a fixing screw or the like.

The actuator base 26, as shown in FIG. 5 or the like, has a base body 26a formed to have a square-frame shape, a fixing portion 26b formed such that the rear half of the base body is bent to be upright, and attachment portions 26c continuously formed on both the side portions of the base body 26a. Both the internal and external side edges of a side opposing the fixing portion 26b of the base body 26a are cut and raised, so that a pair of yokes 38a and 38b arranged opposite to each other with a predetermined gap are formed. On a surface, which opposes the outside yoke 38b, of the inside yoke 38a of the pair of yokes 38a and 38b, the magnet 35 is fixed by a fixing means such as an adhesive agent or the like.

A screw hole 39a for screwing the printed circuit board 25 is formed in the fixing portion 26b of the actuator base 26, and an insertion hole 39b, a notched portion 39c, and positioning holes 40a and 40b are formed in the left and right attachment portions 26c. A wire receiving plate 41 is sandwiched between the fixing portion 26b and the printed circuit board 25 to be integrally fixed.

The wire receiving plate 41 is constituted by a plate material which is long in the lateral direction, and wire receiving portions 41a each having a U-shaped section are respectively formed on both the end portions of the wire receiving plate in the longitudinal direction. A silicon-based gel material 42 is held by each of the wire receiving portions 41a, and the two upper and lower suspension wires 24a and the two upper and lower suspension wires 24b pierce the silicon-based gel materials 42, respectively. By the viscosity of the silicon-based gel materials 42, the respective suspension wires 24a (and 24b ) are elastically supported by the wire receiving portions 41a, whereby improvements in control performances of focus servo and tracking servo are achieved.

The biaxial actuator 21 having such a configuration, for example, can be easily assembled by the following manner. As shown in FIG. 3, to the bobbin 28 on which the focus drive coil 29 and the pair of tracking drive coils 30a and 30b are wound in advance, the holder-integrated lens 32 in which the objective lens 22 and the holder 27 are integrally formed is assembled.

Figure 7A:
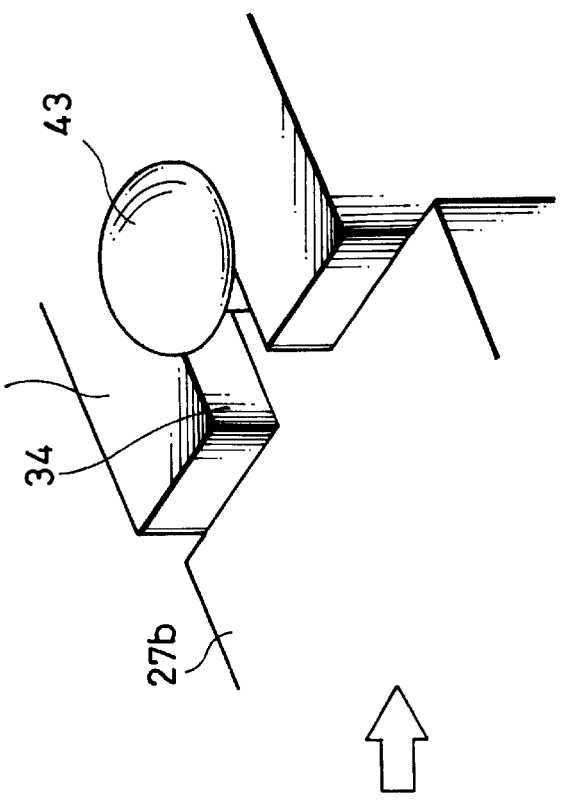
Figure 7C:
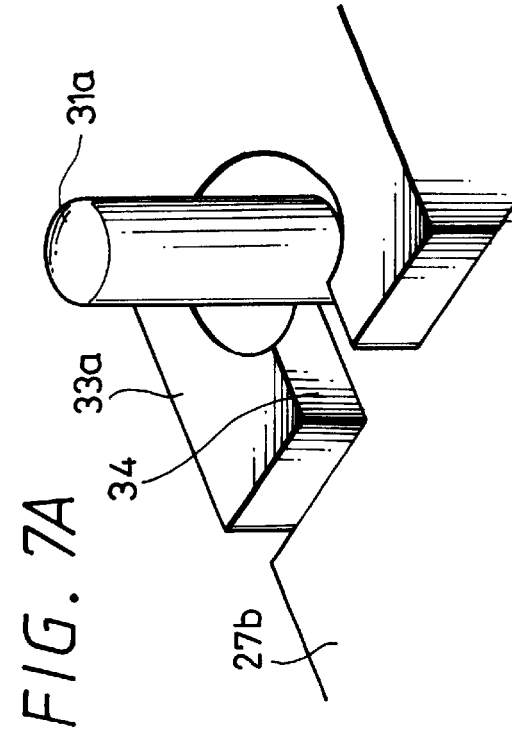
Figure 7B:
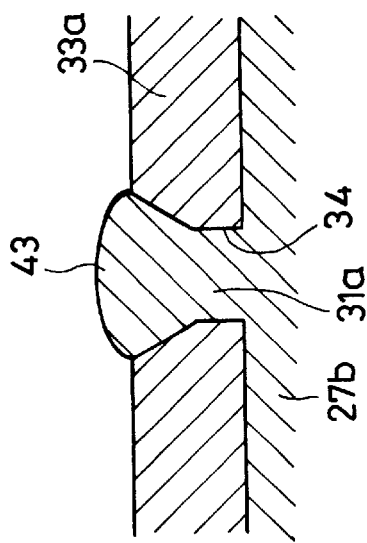
Figure 7D:
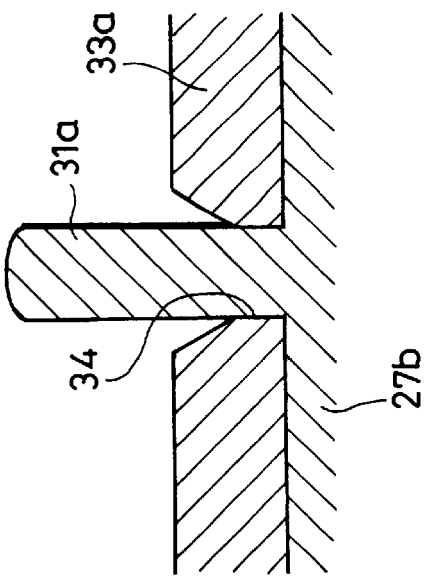

In this case, first, the left and right engagement sides 27c, 27cof the holder 27 are respectively inserted into spaces between the upper and lower engagement pieces 33a, 33a (or 33b, 33b ) arranged on the left and right of the bobbin 28, and, as shown in FIG. 4 and FIG. 7A, the upper and lower engagement pins 31a, 31a(or 31b, 31b) are engaged with the upper and lower engagement pieces 33a, 33a (or 33b, 33b ), respectively. Thereafter, the tip ends of the engagement pins 31aand 31bare melted by heat to be subjected to caulking 43,so that a lens-combined bobbin 44 is constituted. By using an adhesive agent in place of the caulking 43, the engagement pins 31a and 31b may be adhered to the engagement pieces 33a and 33b, so that the lens-combined bobbin 44 may be constituted.

In this manner, although a simple structure is used, the holder-integrated lens 32 and the bobbin 28 are reliably and firmly coupled to each other, so that the lens-combined bobbin 44 having high rigidity as a whole can be manufactured.

The tip ends of the suspension wires 24a and 24b are overlapped on the four hold portions 37a and 37b of the lens-combined bobbin 44, the start portions and the end portions of the focus drive coils 29, 30a, and 30b are independently wound on the suspension wires 24a and 24b. The start portions and the end portions of the focus drive coils 29, 30a, and 30b are joined to the suspension wires 24a and 24b by using a fixing means such as soldering or the like to fix the free end sides of the suspension wires 24a and 24b.

Thereafter, the other end sides of the suspension wires 24a and 24b are caused to pass through the wire receiving portions 41a, and the other end portions are fixed to the printed circuit board 25 by using a fixing means such as soldering or the like. The silicon-based gel materials 42 are filled in the recessed portions of the wire receiving portions 41a, and portions near the fixed ends of the suspension wires 24a and 24b are elastically supported by the silicon-based gel materials 42. In this manner, the biaxial actuator 21 according to this embodiment is manufactured.

The biaxial actuator 21 having the configuration described above, for example, as shown in FIG. 8 and FIG. 9, can be used as an objective lens drive device 50 of an optical pickup device 51 used as a disk drive 50 device of a disk player. The disk drive device 50 is constituted by an optical pickup device 51 serving as an optical block, a chassis 52 for movably supporting the optical pickup device 51, a disk rotation drive mechanism 53 mounted on the chassis 52,and the like.

The optical pickup device 51 has a slide base 54 which is supported such that the slide base can approach and leave from the disk rotation drive mechanism 53, and the biaxial actuator 21 is mounted on the slide base 54. In addition, in the slide base 54, an optical system mechanism having a semiconductor laser, serving as a light source, for emitting a laser beam and a photo detector or the like for receiving a laser beam reflected by a disk are incorporated. The optical path of the optical system of the optical system mechanism is guided on a side of the objective lens 22 exposed on the surface of the slide base 54.

The biaxial actuator 21 having the objective lens 22 is covered with a cover member 55 attached to the slide base 54, and an opening window 55a corresponding to the objective lens 22 is formed in the upper-surface portion of the cover member 55. The information recording surface of an optical disk is caused to oppose the objective lens 22 exposed from the opening window 55a, and a laser beam converged by the objective lens 22 is irradiated on the information recording surface.

A pair of support arms 56 each having a through hole are arranged with a predetermined gap on one side portion of the slide base 54, and a guide arm 57 having a guide groove having an almost U shape is formed on the other side portion. A feeding screw shaft 58 is inserted into the through holes of the pair of support arms 56, and a guide shaft 59 arranged in parallel to the feeding screw shaft 58 is inserted into the guide groove of the guide arm 57. A screw engagement member 60 is meshed with the feeding screw shaft 58 between the support arms 56, and the screw engagement member 60 is fixed to the slide base 54.

The feeding screw shaft 58 is connected to a feeding motor 62 through a gear reduction mechanism 61 at the proximal end portion of the feeding screw shaft such that power can be transmitted, and the drive force of the feeding motor 62 is transmitted to the feeding screw shaft to rotatably drive the feeding screw shaft, thereby moving the slide base 54. More specifically, depending on the directions of forward/backward rotations of the feeding screw shaft 58, the optical pickup device 51 is moved in such directions that the optical pickup device approaches and leaves from the disk rotation drive mechanism 53.

The disk rotation drive mechanism 53 is constituted by a spindle motor 63 fixed to the chassis 52, a disk table 64 fixed to the rotating shaft of the spindle motor 63, and the like. When the optical pickup device 51 is moved from the inner periphery to the outer periphery of the information recording surface of an optical disk chucked on the disk table 64, an information signal recorded in advance on the information recording surface is read.

The magnetic circuit configuration of the biaxial actuator used in the optical pickup device 51 or the like may select configurations as shown in FIG. 10 to FIG. 19. A magnetic circuit 71 of the biaxial actuator shown in FIG. 10 represents the relationships of a pair of yokes 72a and 72b arranged in parallel to each other with a predetermined gap, a magnet 73 fixed on the inner surface of one yoke 72a, a focus drive coil 74 loosely fitted on the yoke 72a having the magnet 73, and a pair of tracking drive coils 75a and 75b arranged on one side of the focus drive coil 74. The pair of yokes 72a and 72b are constituted by a yoke member having a U shape opened upwardly. The pair of tracking drive coils 75a and 75b are horizontally arranged on the same plane of one side of the focus drive coil 74 interposed between both the yokes 72a and 72b.

Figure 13A:
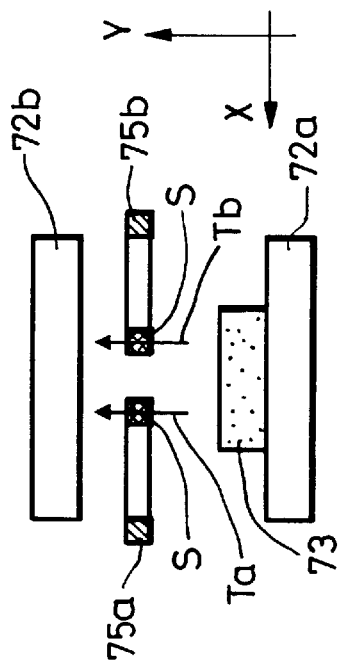
Figure 13C:
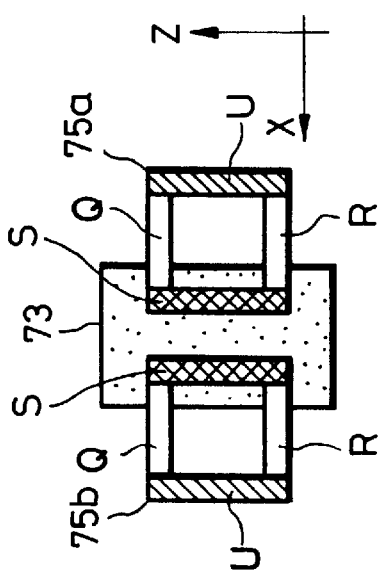
Figure 13B:
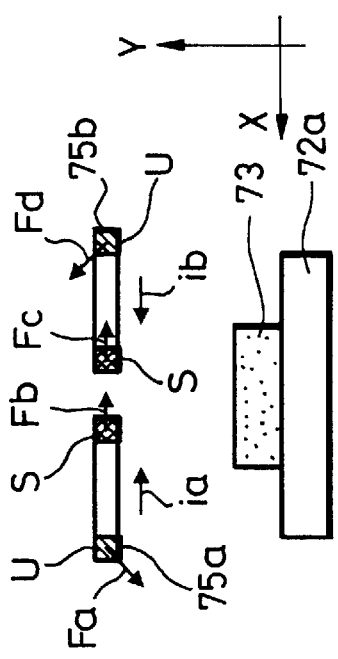
Figure 13D:
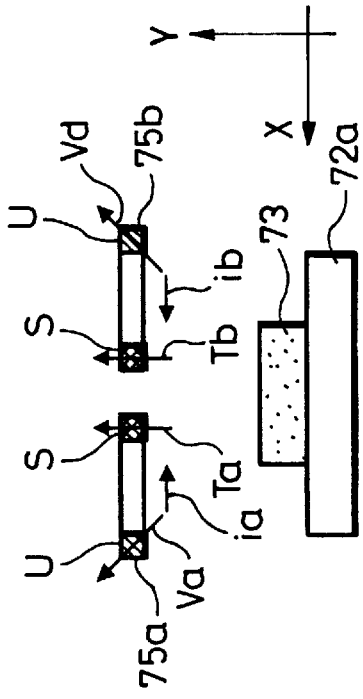

In the magnetic circuit 71 described above, in order to obtain thrusts in an arrow X direction (tracking direction)

and an arrow Z direction (focus direction), the focus drive coil 74 and the pair of tracking drive coils 75a and 75b are used. In this case, only internal portions S, S, which are parallel to the longitudinal direction of the magnet 73, of the tracking drive coils 75a and 75b can generate a required X-direction thrust Fx in the pair of tracking drive coils 75a and 75b, as shown in FIGS. 13A and 13B.

Magnetic fluxes Ta and Tb flow in the above-mentioned pair of tracking drive coils 75a and 75b in directions indicated by arrows respectively as shown in FIG. 11C. As a result, when currents ia and ib flow in the direction of arrows shown in FIG. 13D, on external portions U, U opposing the internal portions S, S, the X component toward the X direction and the Y component toward the Y direction (acting in a direction perpendicular to the X component) of a magnetic flux generated by the magnet 73 are represented as vector quantities Va and Vd, respectively. The X and Y components of a force generated by the magnetic flux are obtained as vector quantities Fa and Fd. Therefore, it may be considered that since the vector quantities Fa and Fd have reverse components in the X direction with respect to vector quantities Fb and Fc of a main thrust, the vector quantities are factors for reducing the thrust.

Figure 14A:
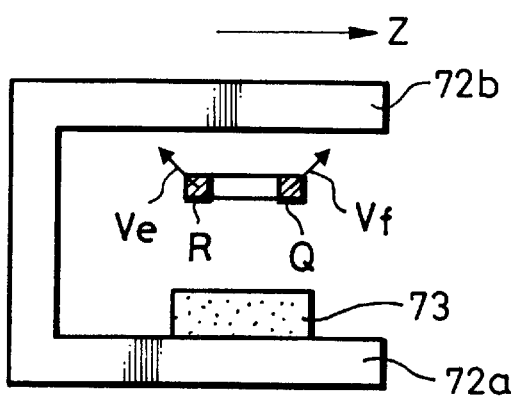
Figure 14B:
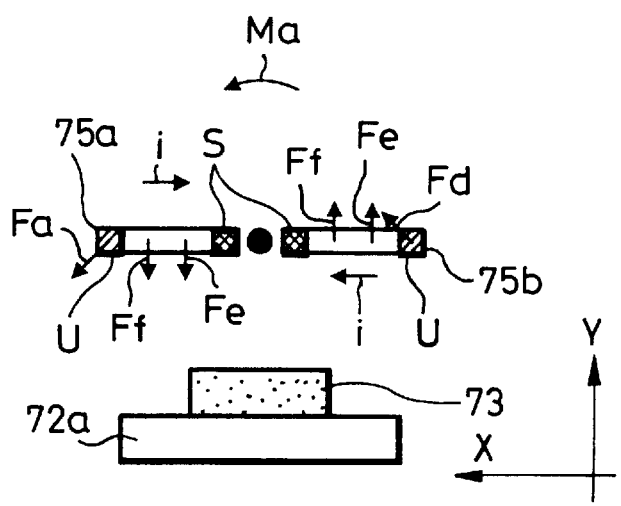

With respect to upper portions Q, Q and lower portions R, R parallel to the X direction except for the internal and external portions S, S and U, U of the pair of tracking drive coils 75a and 75b parallel to a Z direction, as shown in FIG. 14B, forces Fe and Ff are respectively generated by magnetic fluxes Ve and Vf acting as shown in FIG. 14A. By the forces Fa, Fb, Fe, and Ff, a rotation moment Ma having the center of gravity of the magnetic circuit 71 as the center is generated. As a result, the balance of the magnetic thrusts of both the drive coils 74, 75a, and 75b and the position of the center of gravity cannot be easily adjusted. Furthermore, when a magnetic circuit having one magnet 73 is used, the size of the magnet is limited, and an obtained thrust is also limited. For this reason, it may be considered that the thrust is difficult to be increased.

Figure 14C:
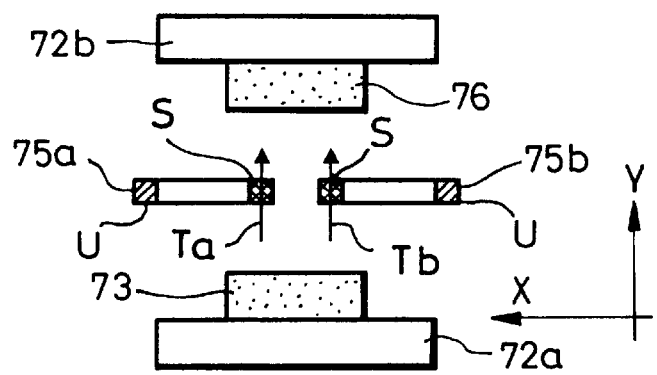

Therefore, in the magnetic circuit 71 of this type, when the thrust by the magnetic circuit is insufficient, as shown in FIG. 14C, another magnet 76 is used on the side of the opposite yokes, magnetic fluxes flowing in the external portions U, U are reduced by the magnet 76, and the magnetic flux densities of the internal portions S, S are increased, so that the thrust can be increased.

On the other hand, as shown in FIG. 11, according to a magnetic circuit 77 having a configuration in which the pair of tracking drive coils 75a and 75b are arranged to be inclined internally to surround the magnet 73 to provide a magnetic circuit, it is possible to improve the positional precision of the pair of tracking drive coils 75a and 75b, improve production efficiency of the winding process achieved by making it possible to directly wind coils on the bobbin, and to present automation. Further, such an effect to improve an electromagnetic conversion rate achieved by an increase in number of selectable coil materials, and narrowing a line shape can be obtained.

Figure 15:
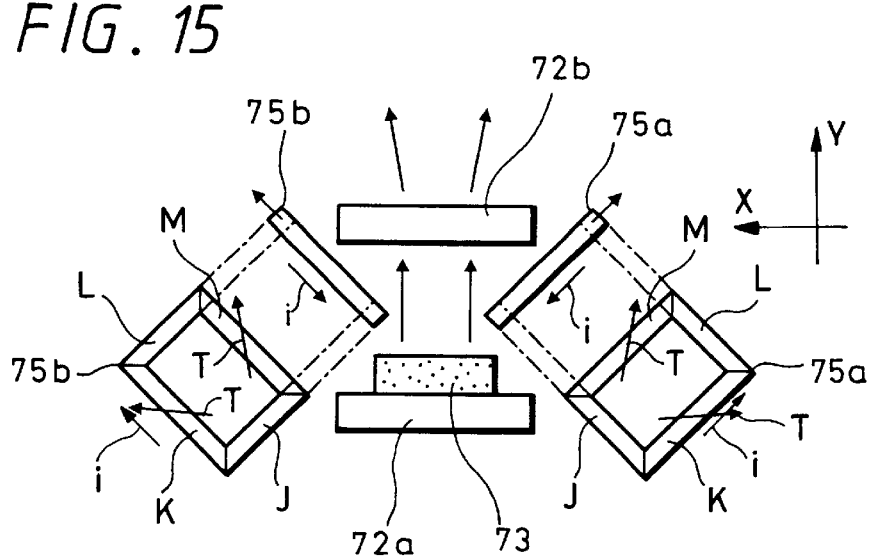
FIG. 15 is a plan view showing the directions of currents obtained when the tracking drive coils are arranged to be externally inclined with respect to the magnet.
Figure 16:
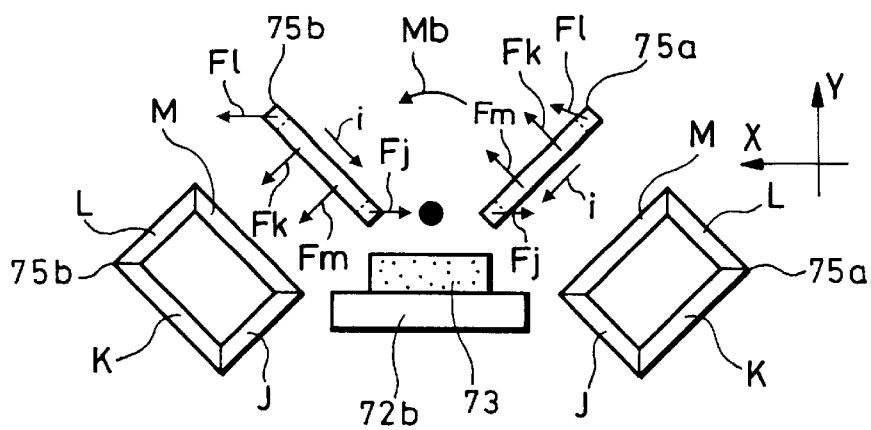
FIG. 16 is a plan view showing the directions of forces obtained when the tracking drive coils are arranged to be externally inclined with respect to the magnet.

As shown in FIG. 12, it may be possible that the inclination direction of the pair of tracking drive coils 75a and 75b is arranged on the opposite side of the magnet 73. In this case, similar to the configuration shown in FIG. 11, it becomes possible that the positional precision of the pair of tracking drive coils 75a, 75b is improved and the coils can be directly wound on the bobbin, whereby such an effect that the production efficiency such as the coil winding process or the like is improved can be obtained. In this case, the flowing directions of the X and Y components of the magnetic fluxes in the tracking drive coils 75a and 75b become arrows T as shown in FIG. 15. As a result, the X- and Y-direction components of forces generated at a J portion, a K portion, an L portion, and an M portion of the tracking drive coils 75a and 75b become as shown in FIG. 16. Thus, it may be considered that the main thrust Fj includes another thrust and a reverse component directed to the X direction.

In this manner, the thrust becomes difficult to be increased, and a rotation moment Mb having the center of gravity of the biaxial actuator with the magnetic circuit 77 as the center is generated by reverse thrusts Fl, Fk, and Fm. Thus, it may be considered that the balance of the magnetic thrusts of the focus drive coil 74 and the pair of tracking drive coils 75a and 75b and the position of the center of gravity becomes difficult to be adjusted.

Therefore, according to the first embodiment of the present invention, by employing the magnetic circuit having the configuration shown in FIG. 11, the biaxial actuator 21 is constituted such that the pair of tracking drive coils 30a and 30b are arranged to be inclined to the magnet 35 side as shown in FIG. 6, and hence the improvement of the characteristics as the biaxial actuator is achieved.

Figure 18A:
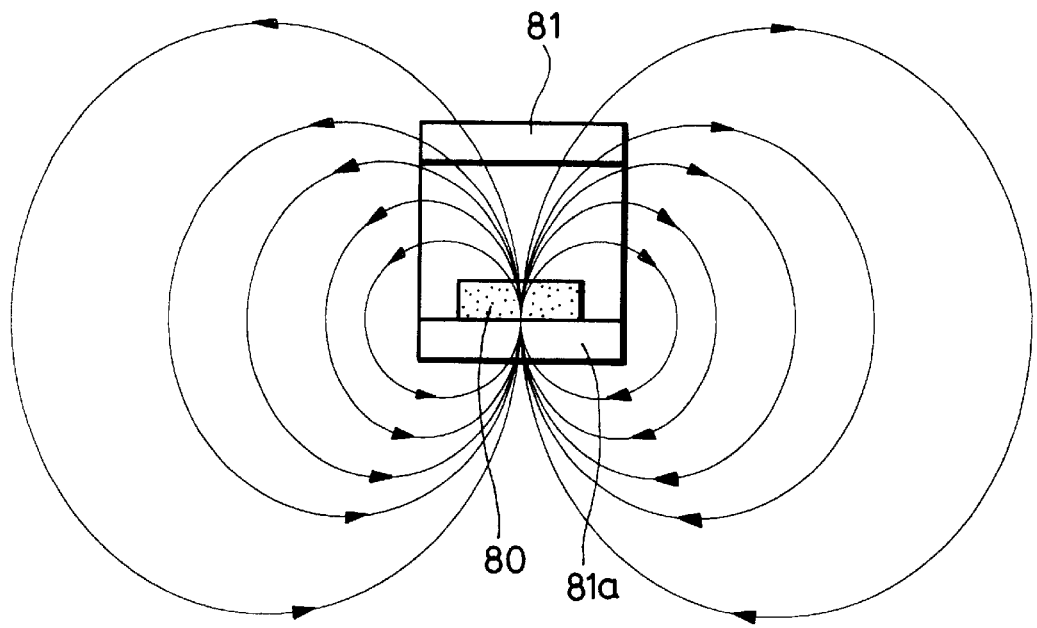
Figure 18B:
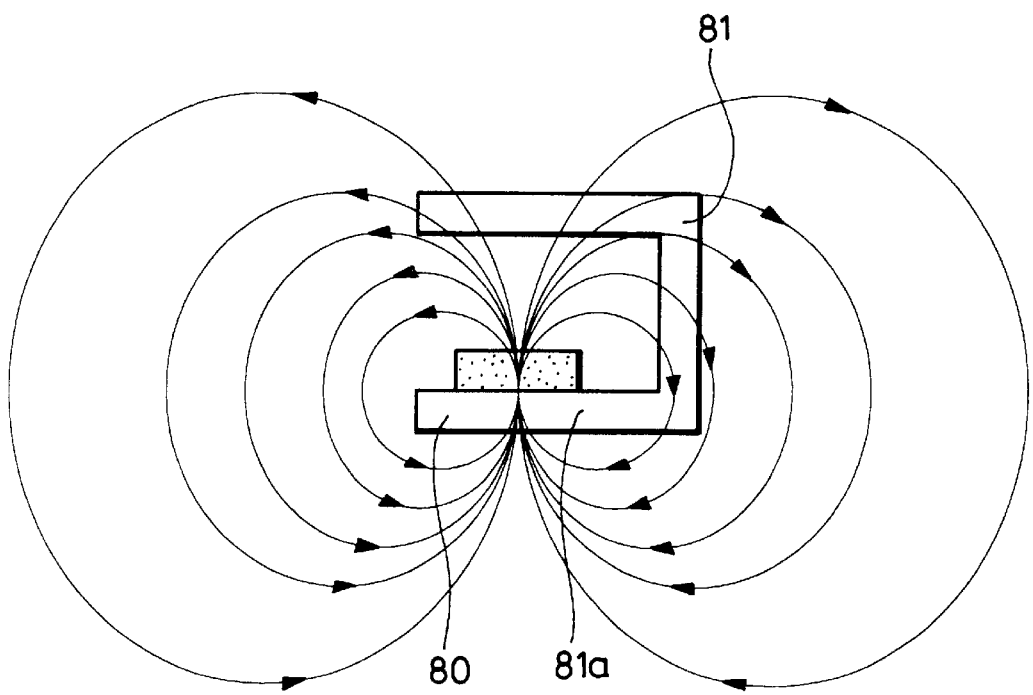

In general, the magnetic fluxes of one magnet, as shown in FIGS. 18A and 18B, are emitted from the N pole and returned to the S pole. When a magnet 80 is attached to one yoke 81a of a yoke member 81 having a U shape, the flows of magnetic fluxes in a space around the magnet 80 are slightly influenced by the yoke. However, the magnetic fluxes are returned from the rear side of the magnet 80 to the yoke 81a.

Figure 17:
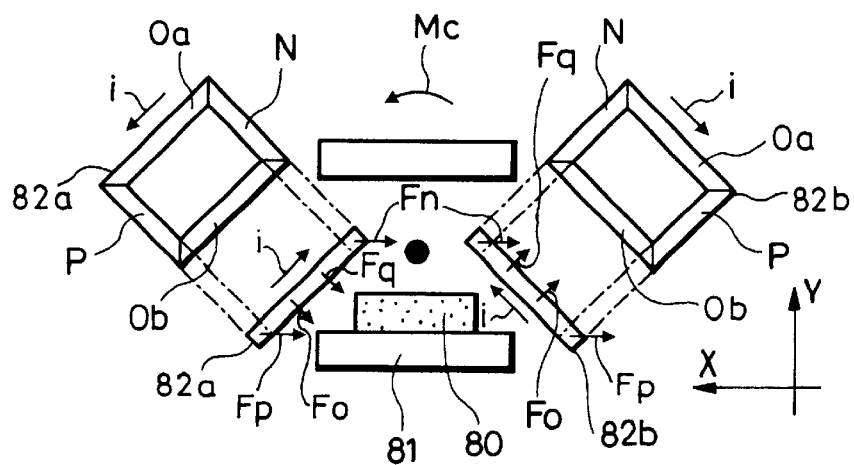
FIG. 17 is a plan view showing the directions of currents and forces obtained when the tracking drive coils are arranged to be internally inclined with respect to the magnet.
Figure 19A:
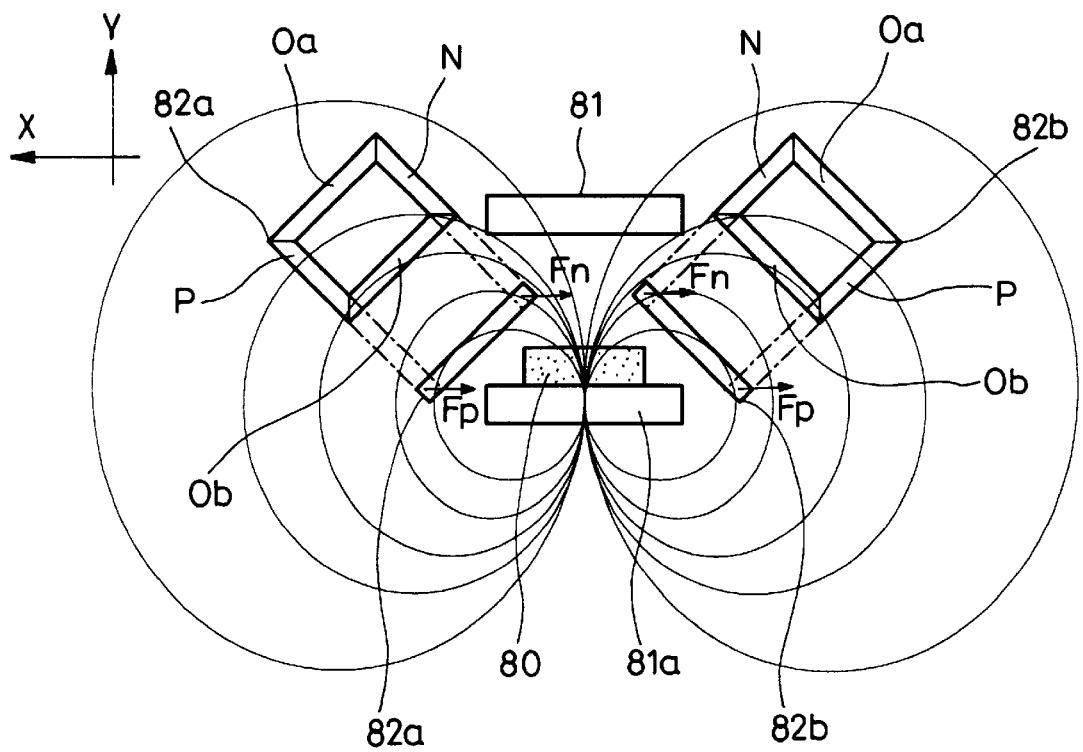
Figure 19B:
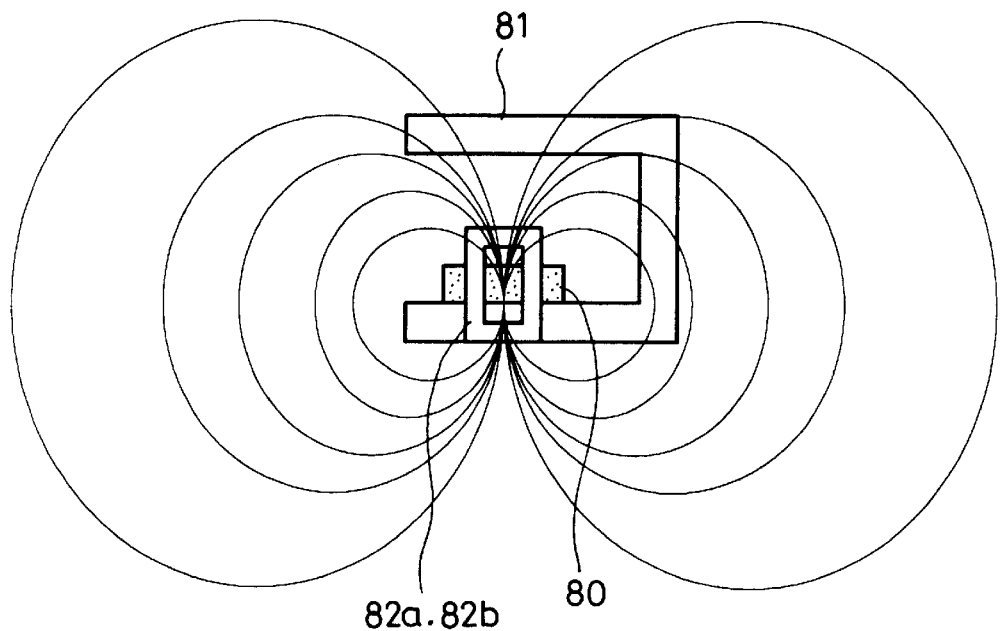
Figure 20:
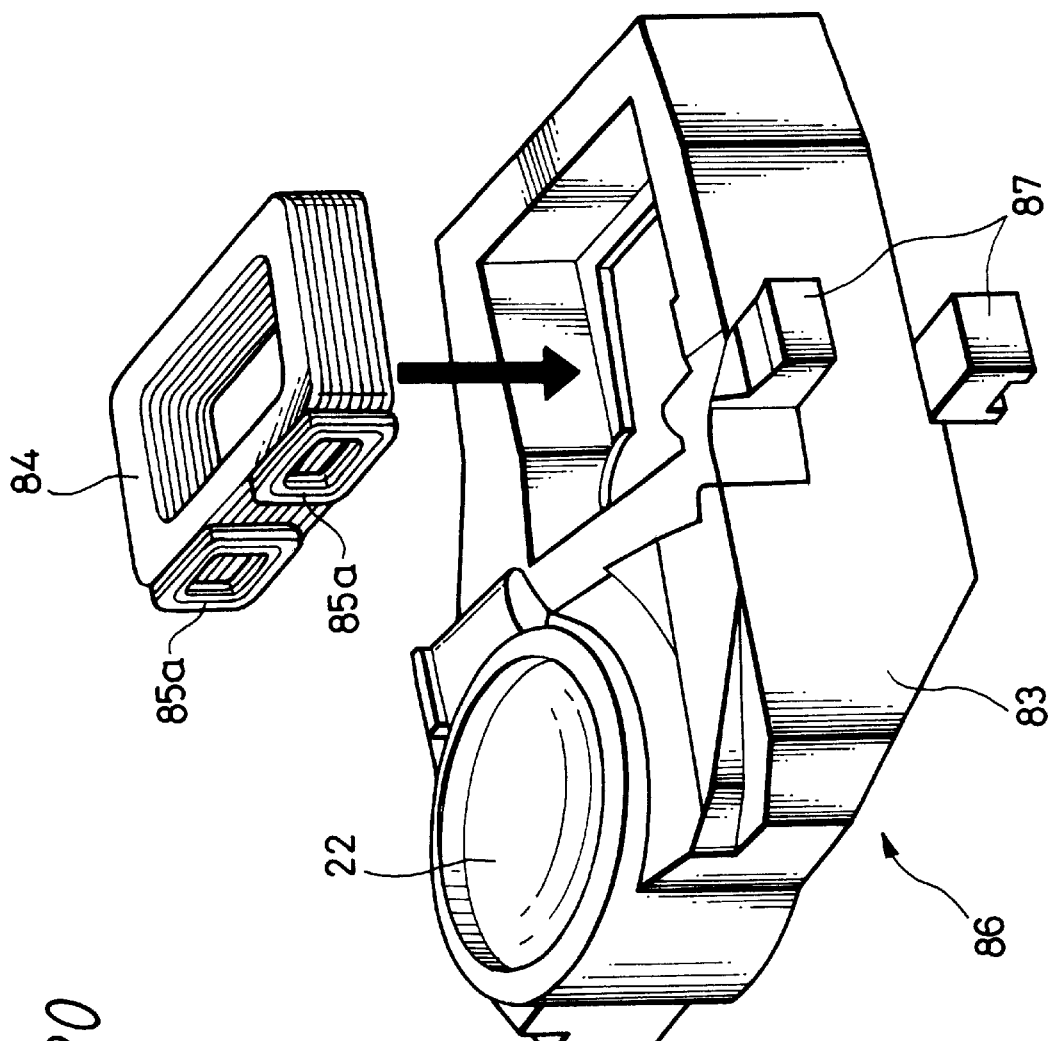
FIG. 20 is a perspective view showing a holder-integrated lens according to a second embodiment of the biaxial actuator of the present invention.

In this case, as shown in FIGS. 19A and 19B, a pair of tracking drive coils 82a and 82b are internally inclined to the magnet 80 on the magnet 80 side, i.e., to cover the magnet 80, and, as shown in FIG. 17, the tracking drive coils 82a and 82b are arranged at positions where magnetic fluxes flow in portions P in parallel to the Y axis. In this manner, thrusts having the components of forces having the same direction as that of forces of portions N of main thrust generating portions can be obtained. When the portions P are only arranged around points where magnetic fluxes flow in the portions P in parallel to the Y axis, thrusts having the components of forces having the same direction as that of forces of portions N of main thrust generating portions can be obtained. Similarly, with respect to portions Oa and Ob, by magnetic fluxes flowing as shown in FIGS. 19A and 19B, thrusts having the components of forces having the same direction as that of forces of portions N of main thrust generating portions can be obtained.

Conventionally, the thrust generating portion of the tracking drive coil is only about a portion occupying ¼ the coil. However, as in the first embodiment, the pair of tracking drive coils 82a and 82b are inclined to the magnet 80 side, and the positions of the portions P are arranged around points where magnetic fluxes flow in parallel to the Y axis, so that thrusts can be obtained on the entire circumference of the tracking drive coils 82a and 82b. The thrusts can be extraordinarily increased.

In addition, as shown in FIG. 17, the rotation moment having the center of gravity of the biaxial actuator as the center can be reduced as compared with FIGS. 14A and 14B and FIG. 16. Therefore, positional displacements of the pair of tracking drive coils 82a and 82b in the Y direction hardly influence the position of the center of gravity of the biaxial actuator. The balance of the respective magnetic thrusts and the position of the center of gravity can be easily adjusted.

When the bobbin on which the focus drive coil and the pair of tracking drive coils are directly wound is made to have the configuration shown in FIG. 3, its mechanical strength increases. Further, when it is made to have a structure for attaching a suspension, a bobbin for only winding is not constituted, but a half structure of the biaxial actuator can be constituted. As a result, a part for holding a lens need not be excessively elongated to obtain an attaching mechanism, a reduction in size of the parts and a reduction in length in the lateral width direction can be achieved. In addition, when the holder-integrated lens and the bobbin are separated from each other, by changing not only the shape of the bobbin but also the material of the bobbin or changing the specific gravity, the balance of the center of gravity can be adjusted. The degree of freedom of the adjustment can be widened. As a result, variations in resonance caused by imbalance can be suppressed.

In addition, by separating the holder-integrated lens from the bobbin, an attachment portion of a suspension wire can be formed on the bobbin side. When a liquid-crystal polymer having soldering heat resistance is used as the material of the bobbin, the suspension can be attached by soldering such that the suspension is wound on the attachment portion. As a result, another part such as a pin or the like for winding is not necessary, a reduction in cost and a reduction in number of parts can be achieved. When the angles of all the winding portions of the tracking drive coils are set to be 90° with respect to the winding angles, and the tracking drive coils are directly wound, aligned winding can be performed. Variations in biaxial characteristics and variations in outer dimension after winding can be suppressed.

FIG. 20 shows another or second embodiment of the biaxial actuator according to the present invention. In this biaxial actuator 82, a holder 83 integrated with an objective lens 22 is formed in the form of a frame, a focus drive coil 84 and tracking drive coils 85a and 85b wound without a bobbin are attached in the frame of the holder 83, so that a lens-integrated holder 86 is constituted. Hold portions 87 for attaching the tip ends of suspension wires are formed at two left positions and two right positions, i.e., a total of four positions on the holder 83.

When the lens-integrated holder 86 is constituted as described above, in addition to the advantages of the embodiment described above, the number of parts can be reduced, and an attachment error can be reduced.

As has been described above, the present invention is not limited to the embodiments described above. For example, in each of the embodiments described above, an optical pickup device used in an optical disk reproducing device using a read-only optical disk as an information recording medium and a biaxial actuator used in the optical pickup device have been described. However, the present invention can be applied to an optical pickup device, using an optical disk as an optical recording medium, for both recording and reproducing and a biaxial actuator for the optical pickup device, or are record-only optical pickup device and a biaxial actuator for the optical pickup device as a matter of course.

In the embodiments described above, an example wherein a structure using a wire-support method is used as the structure of a biaxial actuator has been described. However, a leaf-spring method may be used, and a hinge method in which the link mechanism and the rotating portion of a hinge are made of a synthetic resin having elasticity to support a movable portion and another configuration can also be applied. In addition, the following configuration can also be used. That is, an engagement recessed portion is formed in the holder-integrated lens, and an engagement recessed portion engaged with the engagement recessed portion of the holder-integrated lens is formed in the bobbin. In addition, in place of winding coils, printed coil members may also be used. As described above, the present invention can be changed without departing from the spirit and scope of the invention.

As has been described above, in the biaxial actuator according to the present invention, an advantage that a holder-integrated lens obtained by integrating an objective lens and a holder with each other can be constituted such that the holder-integrated lens is molded by a synthetic resin which can transmit a laser beam can be achieved.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A biaxial actuator, comprising:
   an optical part in which an objective lens for converging a laser beam emitted from a light source to be irradiated on an information recording surface of an optical recording medium and a holder portion provided on an outer periphery of the objective lens are integrally molded by using a synthetic resin which can transmit the laser beam;
   a coil mounted on a part of the holder portion provided in the optical part; and
   a magnetic flux generating means for generating a magnetic flux for the coil.

2. A biaxial actuator according to claim 1, wherein the synthetic resin is a polyolefin-based resin whose main chain has a norborene structure.

3. A biaxial actuator as claimed in claim 1, wherein the holder portion comprises a projection portion extended in a direction perpendicular to an optical axis of the objective lens.

4. A biaxial actuator as claimed in claim 3, further comprising a bobbin to which the coil is attached, wherein the projection portion has a coupling portion to be coupled to the bobbin attached with the coil.

5. A biaxial actuator as claimed in claim 4, wherein to the bobbin there are attached a focus drive coil wound on an axis parallel to an optical axis of the objective lens as a center, and
   first and second tracking drive coils respectively wound on first and second axes each perpendicular to the optical axis as centers.

6. A biaxial actuator as claimed in claim 5, wherein the bobbin has an opening portion opened in parallel to the optical axis of the objective lens, the magnetic flux generating means is inserted into the opening portion, and the first and second tracking drive coils are arranged to be inclined so as to surround the magnetic flux generating means.

7. A biaxial actuator as claimed in claim 4, wherein an engaging projection portion is provided on one of the projection portion and the bobbin, and an engaging concave portion to be engaged with the engaging projection portion is provided on the other thereof, wherein after the engaging projection portion and the engaging concave portion are engaged, a tip end of the engaging projection portion is caulked to thereby couple the optical part and the bobbin.

8. A biaxial actuator as claimed in claim 4, wherein an engaging projection portion is provided on one of the projection portion and the bobbin, and an engaging concave portion to be engaged with the engaging projection portion is provided on the other thereof, and wherein the engaging projection portion and the engaging concave portion are engaged by an adhesive agent.

9. A biaxial actuator as claimed in claim 4, wherein the bobbin is supported by a plurality of metal wires each having a conductive property to be movable in a focus direction and a tracking direction.

10. An optical part, comprising:

an objective lens for converging a laser beam emitted from a light source to be irradiated on an information recording surface of an optical recording medium and a projection portion projected in a direction perpendicular to an optical axis of the objective lens, wherein said objective lens and said projection portion are integrally molded by using a synthetic resin which can transmit the laser beam.

11. An optical part as claimed in claim 10, wherein the synthetic resin is a polyolefin-based resin whose main chain has a norborene structure.

12. An optical part as claimed in claim 10, wherein the projection portion comprises a coupling portion to be coupled to a coil bobbin attached with a coil.

13. An optical part as claimed in claim 10, wherein the projection portion comprises a coil attaching portion to which a coil is attached.

14. An optical disk device, comprising:

a biaxial actuator including an objective lens for converging a laser beam emitted from a light source to be irradiated on an information recording surface of an optical recording medium, a holder portion provided on an outer periphery of the objective lens, a coil to be attached to the holder portion, and a magnetic flux generating means for generating a magnetic flux for the coil;

wherein a laser beam converged by the objective lens is irradiated on the information recording surface to record and/or reproduce an information signal by driving the biaxial actuator in a focus direction and a tracking direction; and wherein the objective lens and the holder portion are integrally molded by using a synthetic resin which can transmit the laser beam.

15. An optical disk device according to claim 14, wherein the synthetic resin is a polyolefin-based resin whose main chain has a norborene structure.

16. An optical disk device as claimed in claim 14, wherein the holder portion comprises a projection portion extended in a direction perpendicular to an optical axis of the objective lens.

17. An optical disk device as claimed in claim 16, further comprising a bobbin to which the coil is attached, wherein the projection portion has a coupling portion to be coupled to the bobbin attached with the coil.

18. An optical disk device as claimed in claim 17, wherein to the bobbin there are attached a focus drive coil wound on an axis parallel to an optical axis of the objective lens as a center, and first and second tracking drive coils respectively wound on first and second axes each perpendicular to the optical axis as centers.

19. An optical disk device as claimed in claim 18, wherein the bobbin has an opening portion opened in parallel to the optical axis of the objective lens, the magnetic flux generating means is inserted into the opening portion, and the first and second tracking drive coils are arranged to be inclined so as to surround the magnetic flux generating means.

20. An optical disk device as claimed in claim 17, wherein an engaging projection portion is provided on one of the projection portion and the bobbin, and an engaging concave portion to be engaged with the engaging projection portion is provided on the other thereof, wherein after the engaging projection portion and the engaging concave portion are engaged, a tip end of the engaging projection portion is caulked to thereby couple the optical part and the bobbin.

21. An optical disk device as claimed in claim 17, wherein an engaging projection portion is provided on one of the projection portion and the bobbin, and an engaging concave portion to be engaged with the engaging projection portion is provided on the other thereof, and wherein the engaging projection portion and the engaging concave portion are engaged by an adhesive agent.

22. An optical disk device as claimed in claim 17, wherein the bobbin is supported by a plurality of metal wires each having a conductive property to be movable in a focus direction and a tracking direction.

* * * * *